US006334656B1

(12) United States Patent
Furukawa et al.

(10) Patent No.: US 6,334,656 B1
(45) Date of Patent: Jan. 1, 2002

(54) METHOD AND SYSTEM FOR CONTROLLING THE YAW MOMENT OF A VEHICLE

(75) Inventors: Yoshimi Furukawa, Wako; Masato Abe, Machida, both of (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/848,498

(22) Filed: May 8, 1997

(30) Foreign Application Priority Data

Jun. 13, 1996 (JP) .................................................. 8-174217

(51) Int. Cl.⁷ ...................................................... B60T 8/60
(52) U.S. Cl. ............................................ 303/146; 303/140
(58) Field of Search .................................. 303/140, 146, 303/147, 186, 189, 962, 191

(56) References Cited

U.S. PATENT DOCUMENTS

| 4,706,976 A | * | 11/1987 | Kawamoto et al. .......... 180/409 |
| 5,251,137 A | * | 10/1993 | Chin et al. .................... 303/146 |
| 5,275,474 A | * | 1/1994 | Chin et al. .................... 303/140 |
| 5,276,387 A | | 1/1994 | Gamble |
| 5,303,989 A | * | 4/1994 | Yasuno et al. ............... 303/147 |
| 5,341,078 A | | 8/1994 | Torii et al. |
| 5,369,580 A | | 11/1994 | Monji et al. .................... 701/70 |
| 5,371,669 A | | 12/1994 | Venkataraman et al. |
| 5,371,677 A | * | 12/1994 | Ehret et al. ...................... 303/93 |
| 5,417,298 A | | 5/1995 | Shibahata |
| 5,455,770 A | | 10/1995 | Hadeler et al. .................... 701/1 |
| 5,474,369 A | | 12/1995 | Inagaki et al. |
| 5,556,176 A | * | 9/1996 | Bosch et al. ................. 303/147 |
| 5,564,800 A | * | 10/1996 | Fischle et al. ................ 303/140 |
| 5,615,117 A | * | 3/1997 | Serizawa ....................... 180/410 |
| 5,742,917 A | * | 4/1998 | Matsuno ........................ 180/197 |
| 5,762,157 A | * | 6/1998 | Uehara ........................... 180/197 |
| 5,772,289 A | * | 6/1998 | Nakazawa et al. ......... 303/146 X |
| 5,899,952 A | * | 5/1999 | Fukada ........................... 303/146 |
| 5,908,225 A | * | 6/1999 | Meier ............................. 303/146 |
| 5,964,819 A | * | 10/1999 | Naito ............................ 303/140 |
| 6,021,367 A | * | 2/2000 | Pilutti et al. ................... 303/146 |

FOREIGN PATENT DOCUMENTS

| DE | 195 23 354 A1 | 1/1996 |
| EP | 0 728 644 A2 | 8/1996 |

OTHER PUBLICATIONS

European Search Report dated Jan. 17, 2000.
Abstract –Proceedings of the 1994 American Control Conference –Part 2; Baltimore, Md., Jun. 29 to Jul. 1, 1994.

* cited by examiner

Primary Examiner—Robert J. Oberleitner
Assistant Examiner—Mariano Sy
(74) Attorney, Agent, or Firm—Arent Fox, Kintner Plotkin & Kahn, PLLC

(57) ABSTRACT

The favorable responsiveness and the stability of a vehicle is sought to be achieved even under extreme traveling conditions. A yawing moment which a vehicle is desired to produce is computed according to a dynamic state quantity of the vehicle such as the vehicle speed and the cornering force of each of the wheels, and a braking force or a traction which is applied to each of the wheels is individually controlled so as to achieve the computed yawing moment. Therefore, even under conditions where the gripping force of the tires is close to a limit, it is possible to improve the responsiveness and stability of the behavior of the vehicle. Further, by using the sliding mode control, it is possible to improve the stability and the robustness of the control system.

7 Claims, 10 Drawing Sheets

— θsw   ------ YG
—·— γ    ——— β

——— X_FL (front left)   ........ X_RL (rear left)
——— X_FR (front right)  - - - - - X_RR (rear right)

—— $\theta_{SW}$  ------ YG
— — $\gamma$   ——— $\beta$

—— $X_{FL}$ (front left)   ........ $X_{RL}$ (rear left)
—— $X_{FR}$ (front right) -------- $X_{RR}$ (rear right)

— θSW ......... YG
— – γ ——— β

——— X_FL (front left)  ........ X_RL (rear left)
——— X_FR (front right) - - - - - - - X_RR (rear right)

——— $\theta_{SW}$ YG
— — $\gamma$ ——— $\beta$

——— $X_{FL}$ (front left) $X_{RL}$ (rear left)
——— $X_{FR}$ (front right) $X_{RR}$ (rear right)

— θSW  ········ YG
— — γ   ——— β

—— XFL (front left)  ······· XRL (rear left)
— XFR (front right)  ------- XRR (rear right)

METHOD AND SYSTEM FOR CONTROLLING THE YAW MOMENT OF A VEHICLE

TECHNICAL FIELD

The present invention relates to a method and a system for controlling a behavior of a vehicle, in particular to a method and a system for controlling the yaw moment of a vehicle so as to achieve a desired responsiveness and a high stability of a vehicle.

BACKGROUND OF THE INVENTION

Four-wheel steering systems (which are abbreviated as 4WS hereinafter) which steer both front and rear wheels have already been put into practical use as a technology for improving the response and stability of a traveling vehicle. Also put into practical use are anti-lock brake systems (which are abbreviated as ABS hereinafter) which control the braking force so as not to lock up the tires by detecting a slip ratio between the wheels and the road surface, and traction control systems (which are abbreviated as TCS hereinafter) which control the traction so as not to freely spin the wheels on the road surface having a low frictional coefficient.

However, although a 4WS is highly effective in improving the responsiveness and stability of a vehicle in a linear region where a linear relationship holds between the slip angle and the cornering force, and the adhesive force between the tires and the road surface is substantially smaller than the maximum possible grip force of the tires, upon onset of a non-linear relationship between the slip angle and the cornering force (when the vehicle is traveling under extreme conditions where the grip force of the tires almost reaching its limit, or when the vehicle is traveling over a low-$\mu$ road surface), because even though all of the four wheels are steered, the slip angles of the wheels become unable to make any further contribution in increasing the cornering force.

Also, when a braking force or a traction is applied to the wheels, this alone can reduce the cornering force, and thereby affect the turning behavior of the vehicle. Conventionally, the control actions for 4WS, ABS and TCS were individually carried out, and these control systems were therefore unable to comprehensively and/or jointly improve the response and stability of the vehicle under all conditions.

BRIEF SUMMARY OF THE INVENTION

In view of such problems of the prior art, a primary object of the present invention is to provide a method and a system which can maximize the responsiveness and stability of a vehicle for each given traveling condition of the vehicle.

A second object of the present invention is to provide a method and a system which can maintain the favorable responsiveness and the stability of a vehicle even when the traveling condition of the vehicle is such that the dynamic properties of the tires are in a non-linear region.

A third object of the present invention is to provide a method and a system which can achieve a maximum improvement of the handling of a vehicle with a minimum expense.

According to the present invention, these and other objects of the present invention can be accomplished by providing a method for controlling a vehicle behavior by individually controlling a fore-and-aft force of each of right and left vehicle wheels so as to achieve a desired vehicle behavior, comprising the steps of: computing a yawing moment which a vehicle is desired to produce according to a dynamic state quantity of the vehicle including at least a traveling speed, and cornering forces which the wheels produce; and controlling a fore-and-aft force which is applied to each of the wheels so as to achieve said computed yawing moment.

By thus appropriately distributing a fore-and-aft force such as a braking force or a traction to each of the wheels, it is possible to control the vehicle in such a manner which has heretofore not been possible. The cornering forces may be directly detected by using suitable sensors, but may also be estimated from a dynamic state quantity of the vehicle such as the frictional coefficient of the road surface. Therefore, it is made possible to favorably control the vehicle in a more positive manner, and even under most extreme conditions. For the modes of controlling the fore-and-aft force of each of the wheels, reference should be made to U.S. Pat. No. 5,417,298 issued May 23, 1995 to Y. Shibahata, and U.S. Pat. No. 5,474,369 issued Dec. 12, 1995 to H. Inagaki et al, both of which are assigned to the common Assignee. The contents of these patents are hereby incorporated in this application by reference.

Typically, a desired yaw response is determined in according to a dynamic state quantity of the vehicle, and the vehicle is controlled in such a manner that the desired yaw response may be achieved. It is also possible to control the fore-and-aft forces of the wheels so as to achieve a desired vehicle body slip angle.

It was confirmed that the sliding surface control can achieve favorable results when applied to the method of the present invention.

This method can be carried out by a system which comprises means for controlling a fore-and-aft force which is individually applied to each of right and left vehicle wheels; means for detecting a dynamic state quantity of the vehicle including at least a traveling speed; means for determining a cornering force of each of the wheels; and means for computing a yawing moment which a vehicle is desired to produce according to values obtained by said dynamic state quantity computing means and said cornering force determining means; wherein said fore-and-aft force control means is controlled according to a value obtained by said yawing moment computing means.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
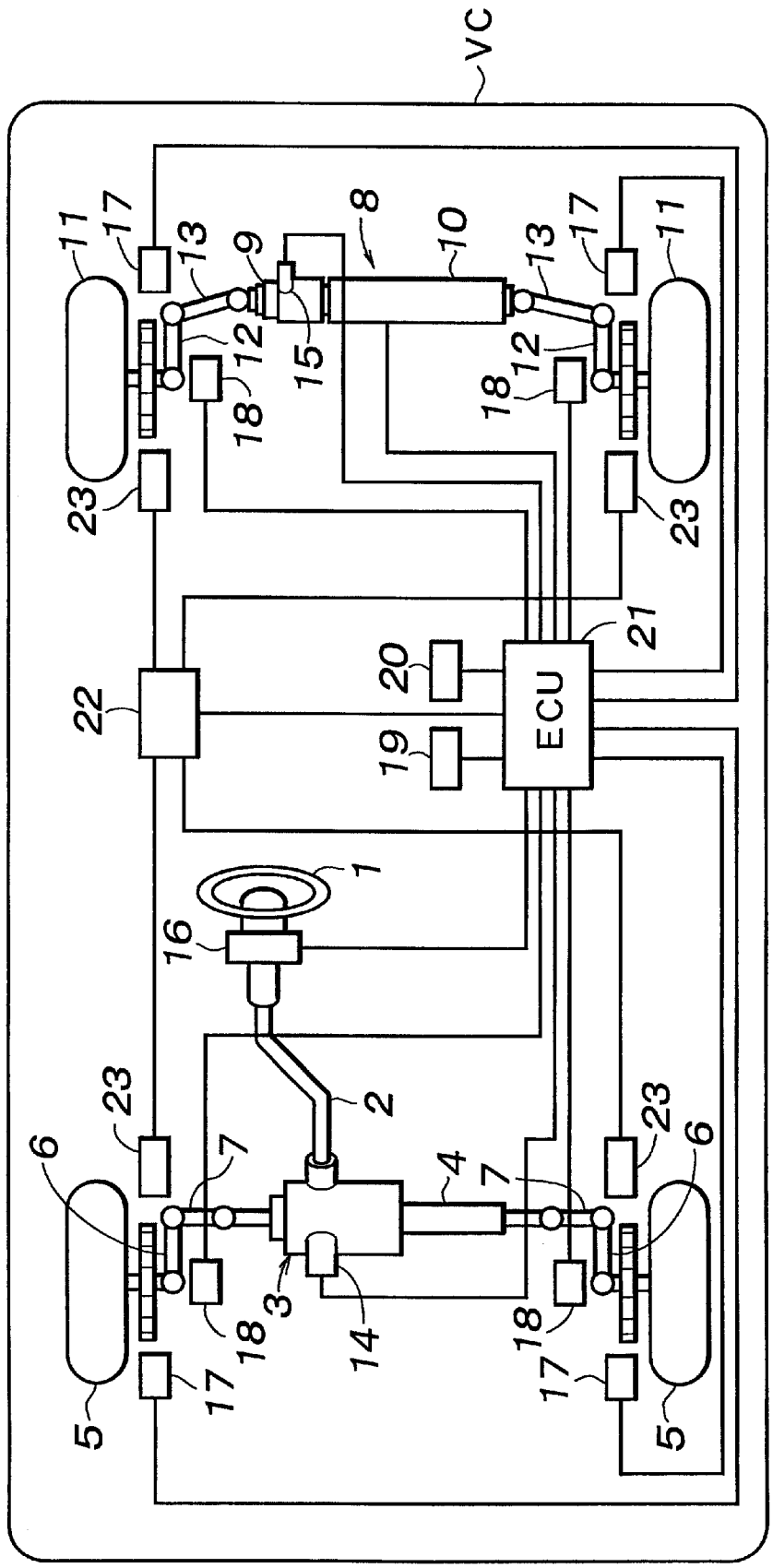
FIG. 1 is an overall diagrammatic view of a four wheel steering vehicle to which the present invention is applied.

FIG. 1 schematically illustrates the overall structure of a four wheel steering vehicle VC to which the present invention is applied. Referring to FIG. 1, a steering shaft 2, having a steering wheel 1 fixedly secured to an end thereof, is mechanically connected to a steering rod 4 of a front wheel steering device 3. The two ends of the steering rod 4 are connected to respective knuckle arms 6, which are attached to right and left front wheels 5, via tie rods 7.

The rear wheel steering device 8 placed near a rear axle is also provided with a steering rod 9 extending laterally of the vehicle body which is actuated by an electric motor 10. The two ends of the steering rod 9 are connected to respective knuckle arms 12, which are attached to right and left rear wheels 11, via tie rods 13, similarly to the steering rod 4 on the side of the front wheels 5.

The brake device for each of the wheels is equipped with a brake actuator 23, the braking force of which is individually controlled by hydraulic pressure supplied from a braking force distribution modulator 22.

The front and rear wheel steering devices 3 and 8 are equipped with steering angle sensors 14 and 15 for detecting the steering angles of the front wheels 5 and the rear wheels 11 by detecting the displacements of the corresponding steering rods 4 and 9. The steering shaft 2 is also provided with a steering angle sensor 16 for detecting the angular position of the steering wheel 1. The wheels 5 and 11 are each provided with a wheel speed sensor 17 and a cornering force sensor 18, and a yaw rate sensor 19 and a vehicle body slip angle sensor 20 are placed in suitable locations on the vehicle body.

These sensors 14 to 20 are electrically connected to a computer unit 21 which controls the electric motor 10 and the braking force distribution modulator 22.

In this four wheel steering vehicle VC, as the vehicle operator turns 35 the steering wheel 1, the steering rod 4 of the front wheel steering device 3 is mechanically actuated so that the front wheels 5 are turned. The front wheel steering device 3 may consist of a manual steering device, but typically consist of a hydraulic, electric or otherwise powered steering device. At the same time, the angular displacement of the steering wheel 1 and the linear displacement of the steering rod 4 are detected by the corresponding steering angle sensors 14 to 16, and are supplied to the computer unit 21. According to the operating condition of the vehicle which may be indicated by the steering angle $\theta_{sw}$ of the steering wheel, the vehicle speed V, the yaw rate $\gamma$, and the vehicle body slip angle $\beta$, the computer unit 21 determines the optimum steering angle of the rear wheels 11 for each given front wheel steering angle $\delta_F$. The electric motor 10 is activated so that the rear wheels 11 are steered accordingly. The rear wheel steering angle $\delta_R$ is feed-forward controlled so that the vehicle body slip angle $\beta$ is always zero in the linear region of the dynamic properties of the tires.

Now is described a control algorithm which improves the responsiveness and stability of such a four wheel steering vehicle VC by controlling the fore-and-aft forces of the tires under operating conditions where the dynamic properties of the tires are in a non-linear region. When the braking force is selected as the fore-and-aft forces, the total braking force is determined according to the force applied to the brake pedal, and is distributed to the four wheels according to individually determined loading ratios. These standard braking forces assigned to the different wheels are modified according to the algorithm which is described in the following. The method for individually controlling the braking forces of different wheels may be based on the technology which is disclosed in Japanese patent laid-open publication No. 7-69190, and is not described here any further.

Figure 2:
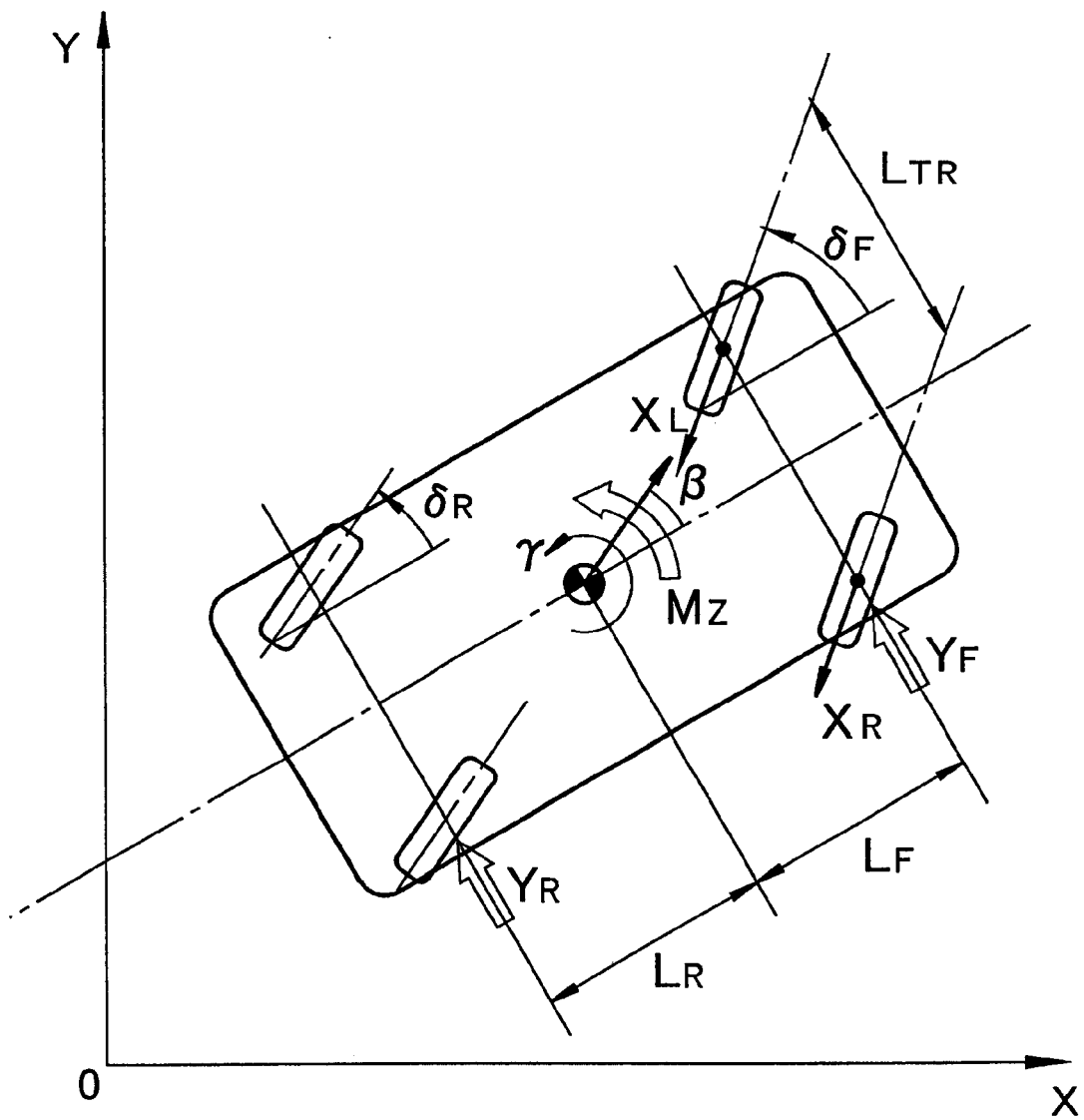
FIG. 2 is a diagram showing a typical planar movement of the vehicle.

The following gives the basic equations of the planar motion of the vehicle accounting for the yawing moment around the gravitational center of the vehicle body which serves as the basis for the control process according to the present invention.

$$mV(d\beta/dt+\gamma)=Y_F+Y_R \tag{1}$$

$$Id\gamma/dt=L_F Y_F L_R Y_R + MZ \tag{2}$$

where m is the mass of the vehicle, V is the traveling speed, $\beta$ is the vehicle body slip angle, $\gamma$ is the yaw rate, $Y_F$ is the cornering force of the front wheels (the sum of the cornering forces of the right and left wheels), $Y_R$ is the cornering force of the rear wheels (the sum of the cornering forces of the right and left wheels), I is the moment of inertia of the vehicle, $L_F$ is the distance between the front axle and the gravitational center, $L_R$ is the distance between the rear axle and the gravitational center, and Mz is the yawing moment around the gravitational center (see FIG. 2).

In case of a steering maneuver while applying a brake (or a traction), when a yawing moment which gives rise to a favorable response in the nonlinear region of the dynamic properties of the tires is attempted to be produced by controlling the fore-and-aft forces of the tires with a sliding mode control (refer to U.S. Pat. No. 5,276,387 issued Jan. 4, 1994 to J. B. Gamble, U.S. Pat. No. 5,341,078 issued Aug. 23, 1994 to N. Torii et al, and U.S. Pat. No. 5,371,669 issued Dec. 6, 1994 to S. T. Venkataraman et al), the sliding surface which defines the favorable response that is desired to be achieved can be expressed by the following equation.

$$S=d\beta/dt+c[\beta+a\{(Y_F+Y_R)/mV\}-\gamma=0 \tag{3}$$

The sliding condition for achieving this can be given as follows.

$$dS/dt=-kS \tag{4}$$

Here, c, a and k are appropriately selected constants, and the values of these constants dictate the quality of control.

If S of Equation (3) is substituted into Equation (4), one obtains the following equation.

$$d^2\beta/dt^2+c[d\beta/dt+a\{(dY_F/dt+dY_R/dt)/mV\}-d\gamma/dt]+kd\beta dt+kc[\beta+a\{(Y_F+Y_R)/mV\}-\gamma]=0 \tag{5}$$

If the yawing moment Mz which satisfies Equation (5) by using Equations (1) and (2) can be obtained in a both reasonable and practical fashion, it can serve as a basic principle of the control process. From Equation (1), one obtains $$d^2\beta/dt^2=(dY_F/dt+dY_R/dt)/mV\}-d\gamma/dt \tag{1-2}$$

When this is substituted into Equation (5), one obtains $$(1+ca)\{(dY_F/dt+dY_R/dt)/mV\}-d\gamma/dt\}+kca\{\{(Y_F+Y_R)/mV\}-\gamma]+(k+c)d\beta/dt+kc\beta=0 \quad (6)$$

From Equation (2), one obtains $$d\gamma/dt=(L_F Y_F - L_R Y_R + MZ)/I \quad (2\text{-}2)$$

When this is substituted into Equation (6), one obtains $$\{(Cdf_F/dt+Cdf_R/dt)/mV\}-\{(L_F Cf_F - L_R Cf_R + Mz)/I\}+\{kca/(1+ca)\}\{(Cf_F - Cf_R)/mV - \gamma\}+d\beta/dt\{(k+c)/(1+ca)\}+I\beta\{kc/(1+ca)\}=0 \quad (7)$$

From Equation (7), the following equation can be obtained as a basic control principle.

$$Mz = -(L_F Y_F - L_R Y_R) + (I/mV)(dY_F/dt + dY_R/dt) + \quad (8)$$
$$\{kca/(1+ca)\}\{(Cf_F - Cf_R)/mV - \gamma\} +$$
$$Id\beta/dt\{(k+c)/(1+ca)\} + I\beta\{kc/(1+ca)\}$$

Based on the above equation, it is possible to obtain the yawing moment Mz which achieves the desired response by detecting the cornering forces $Y_F$ and $Y_R$ of the front and rear wheels, the yaw rate γ, and the vehicle body slip angle β. Because the tread $L_{TR}$ is a fixed value, once the yawing moment Mz is known, the right and left ratio of the fore-and-aft forces of the tires or the braking forces (traction forces) can be determined according to the following equation.

$$MZ=(X_R-X_L)L_{TR}$$

By thus individually controlling the braking forces $X_R$ and $X_L$ of the right and left wheels by using the braking force distribution modulator 22 and the brake actuator 23, it is possible to improve the responsiveness and stability of the vehicle under operating conditions where the dynamic properties of the tires are in a non-linear region.

Figure 3:
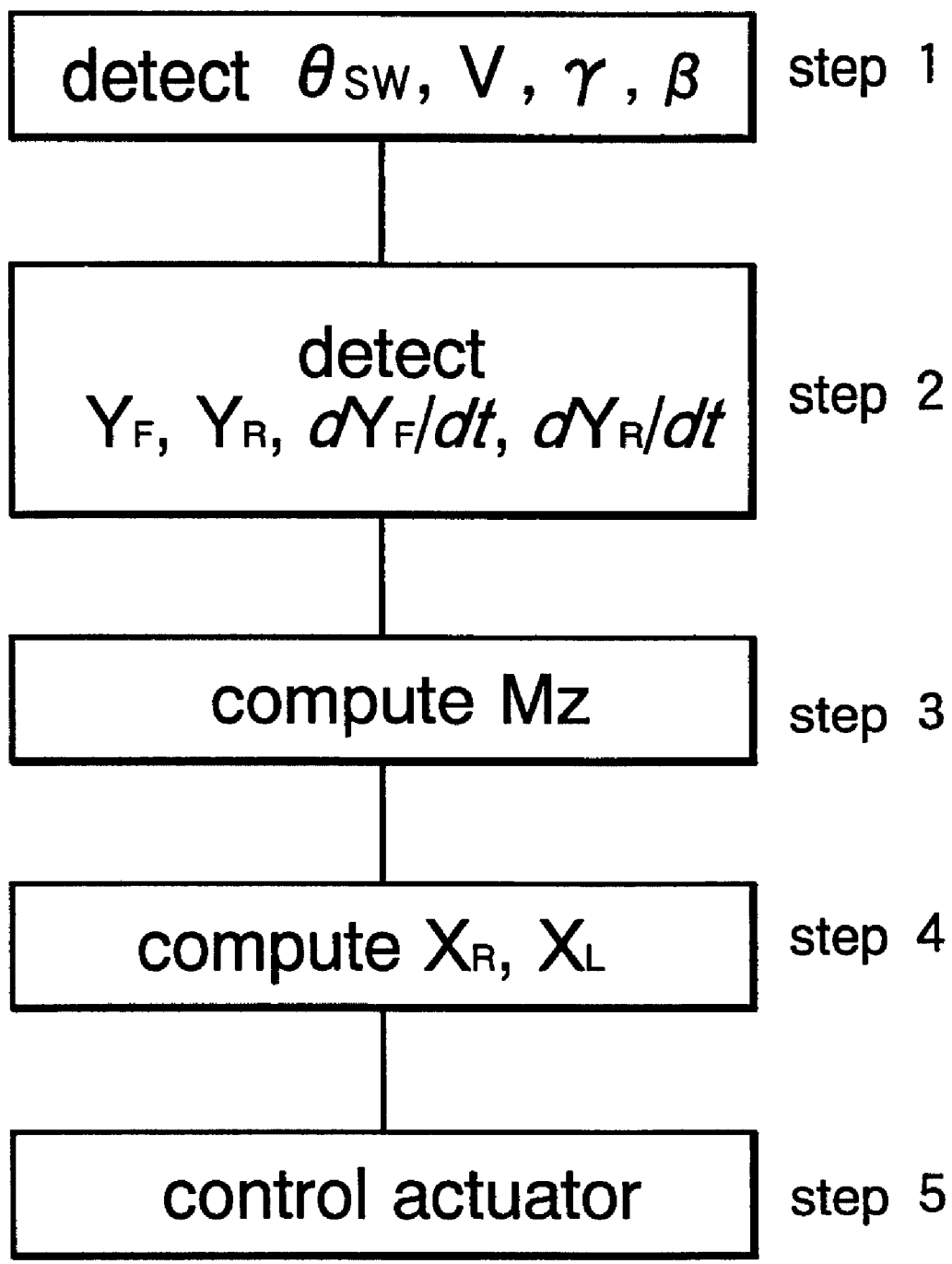
FIG. 3 is a block diagram showing a basic control flow according to the present invention.
Figure 4:
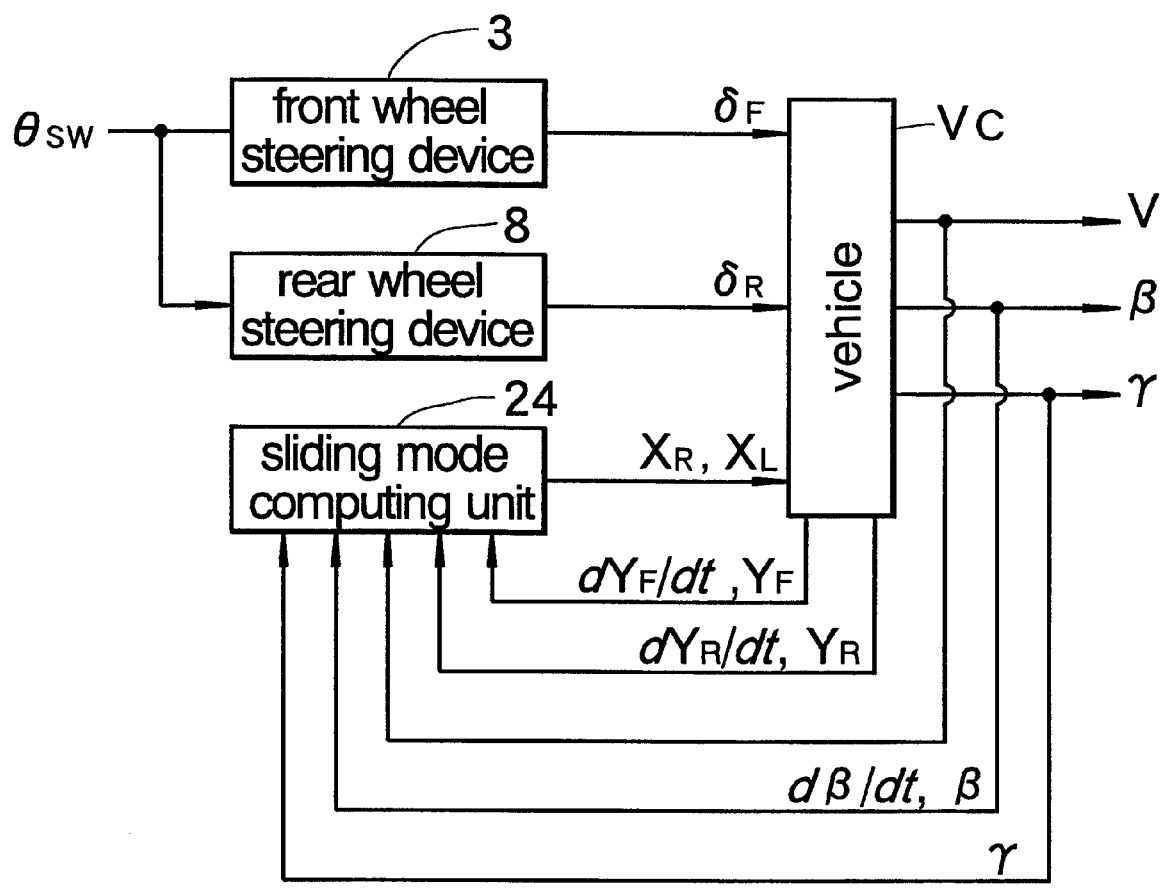
FIG. 4 is a block diagram showing a control flow according to the present invention

Referring to FIGS. 3 and 4, data such as the steering wheel steering angle θsw, the vehicle speed V, the vehicle body slip angle β, and the yaw rate γ are supplied to a sliding mode computing unit 24 in the computer unit 21 (step 1). The sliding mode computing unit 24 also receives the cornering forces $Y_F$ and $Y_R$ acting upon the front and rear axles which are detected by the cornering force sensors 18 typically consisting of resistive strain gauges attached to knuckle portions supporting the wheels, and their derivatives $dY_F/dt$ and $dY_R/dt$ (step 2). The yawing moment Mz is computed from these values (step 3), and the braking forces $X_R$ and $X_L$ which the right and left wheels should be producing are computed (step 4). Then, the liquid pressure which is to be supplied to the brake actuator 23 of each of the wheels is controlled by the braking force distribution modulator 22 (step 5).

Figure 5:
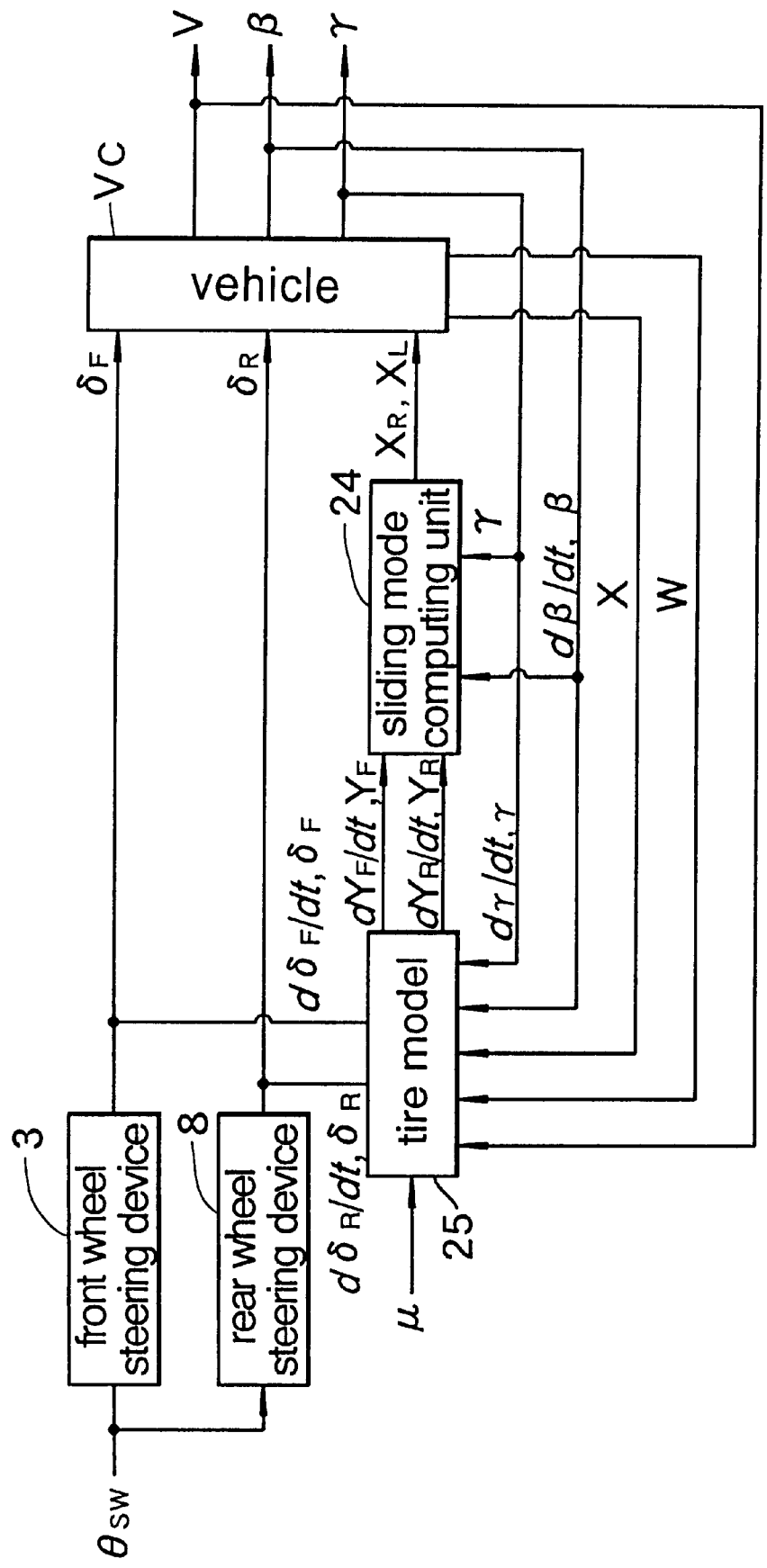
FIG. 5 is a block diagram showing another control flow according to the present invention.

Because $d\beta/dt=YG/V-\gamma$, the vehicle body slip angle β can be also computed from the lateral acceleration YG, the vehicle speed V, and the yaw rate γ. The cornering force can be substituted by the lateral acceleration, and the detected values of a load sensor and an acceleration sensor can be appropriately combined to obtain the vehicle body slip angle β. Also, the cornering forces $Y_F$ and $Y_R$ were directly obtained in the above example, but it is also possible to estimate them from the frictional coefficient μ between the tires and the road surface which can be detected from the difference in the rotational speeds of the driven wheels and the non-driven wheels, the steering angles of the front and rear wheels, the vertical loads acting on the axles, and the fore-and-aft forces by using a tire model 25 (FIG. 5) consisting of a mathematical model of the dynamic properties of the tire. The block diagram of an exemplary control system for this case is shown in FIG. 5. However, in this case, it is necessary to find the fore-and-aft force for computing the estimated value of the cornering force, and the estimated value of the cornering force in turn newly determines the fore-and-aft force. Therefore, in practice, the fore-and-aft force is computed from a recursive computation.

The results of simulations are explained in the following with reference to FIGS. 6 to 10 in which a four wheel steering vehicle was steered by turning the steering wheel by 60 degrees in each direction consecutively while decelerating from an initial speed of 120 km at the rate of 0.4 G on a road surface of μ=1.0, and the weighting of the coefficients k, a and c in the above control principle was variously changed.

Figure 6A:
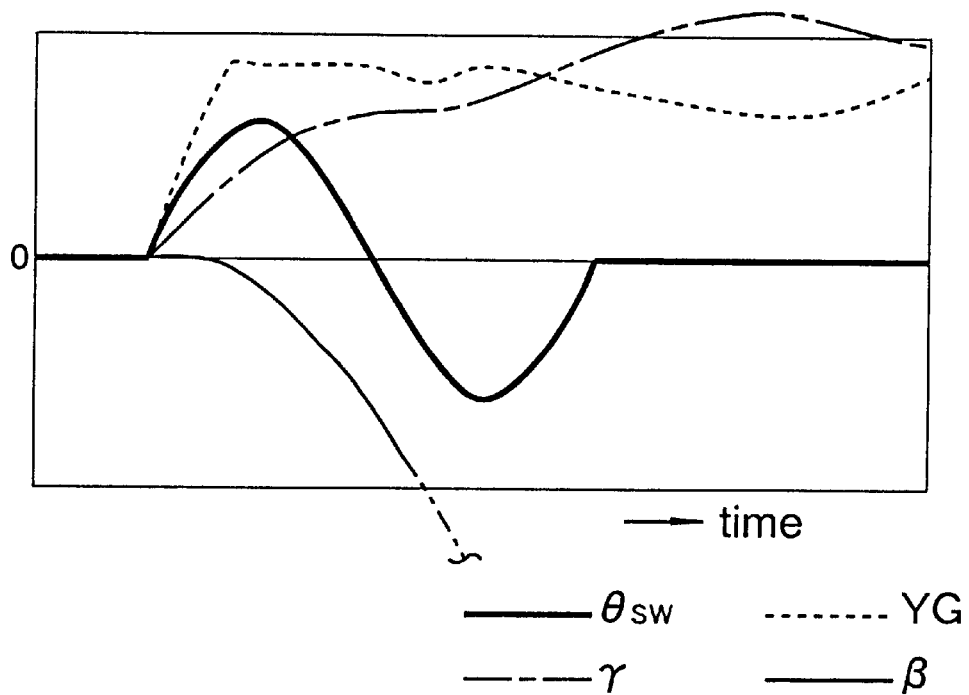
FIGS. 6a–b are graphs showing the behavior of a vehicle when the control action of the present invention is not applied.
Figure 6B:
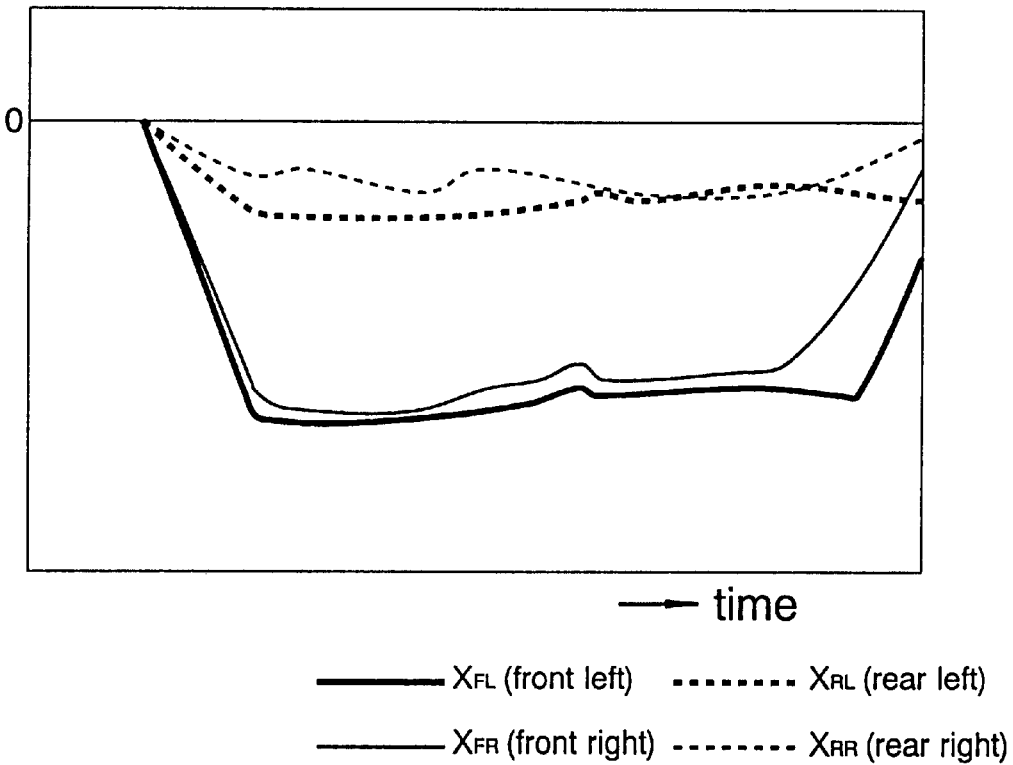

FIGS. 6a–b show the behavior of the four wheel vehicle when no control action of the present invention was applied. In this case, the braking force or the fore-and-aft force X was evenly applied to the right and left wheels, and the yaw rate γ and the lateral acceleration YG demonstrated divergent tendencies while the vehicle body slip angle maintained a relatively large value in one direction. This means that the vehicle body was unable to respond to the turning back of the steering wheel, and was in a spin.

[Embodiment 1]

When coefficient a=0, the sliding surface in this case was given by $$S=d\beta/dt+c\beta=0 \quad (3\text{-}2)$$

In other words, an optimum responsiveness is sought while aiming to control only the vehicle body slip angle β to zero.

In this case, the control principle may be given by the following equation.

$$Mz = -(L_F Y_F - L_R Y_R) + (I/mV)(dY_F/dt + dY_R/dt) + \quad (8\text{-}2)$$
$$Id\beta/dt(k+c) + I\beta kc$$

Figure 7A:
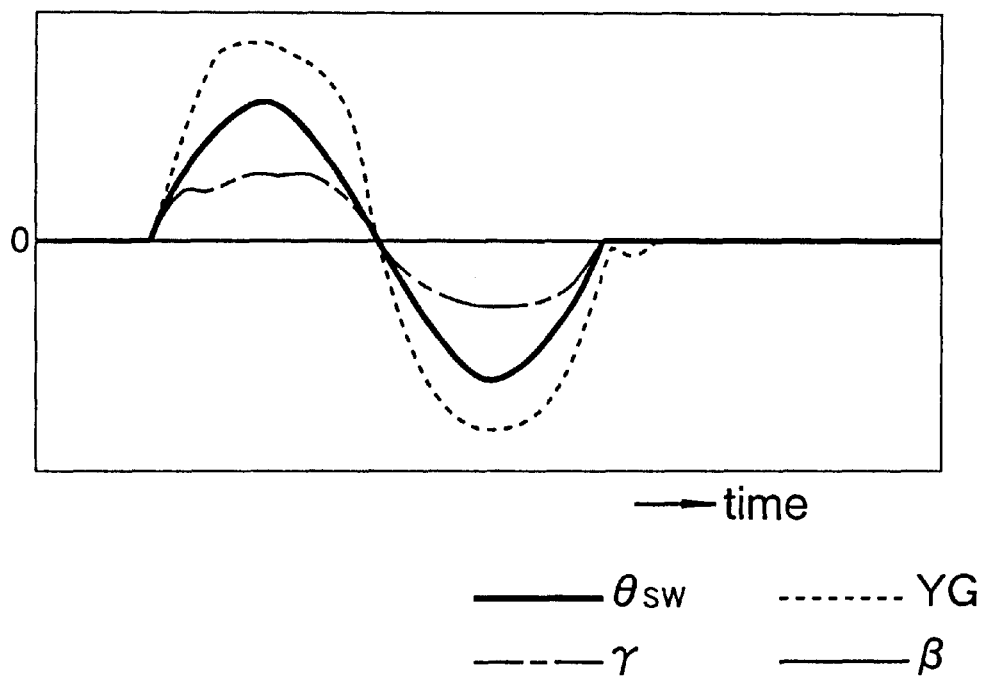
FIGS. 7a–b are graphs showing the behavior of the vehicle according to the first embodiment of the present invention.
Figure 7B:
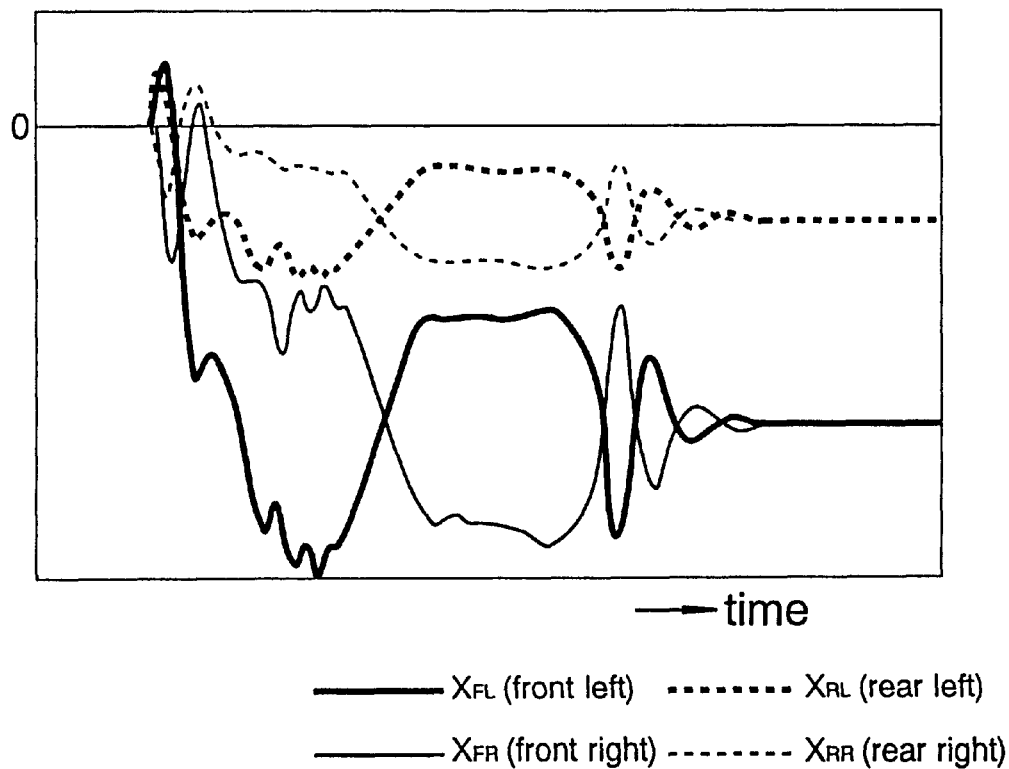
Figure 8A:
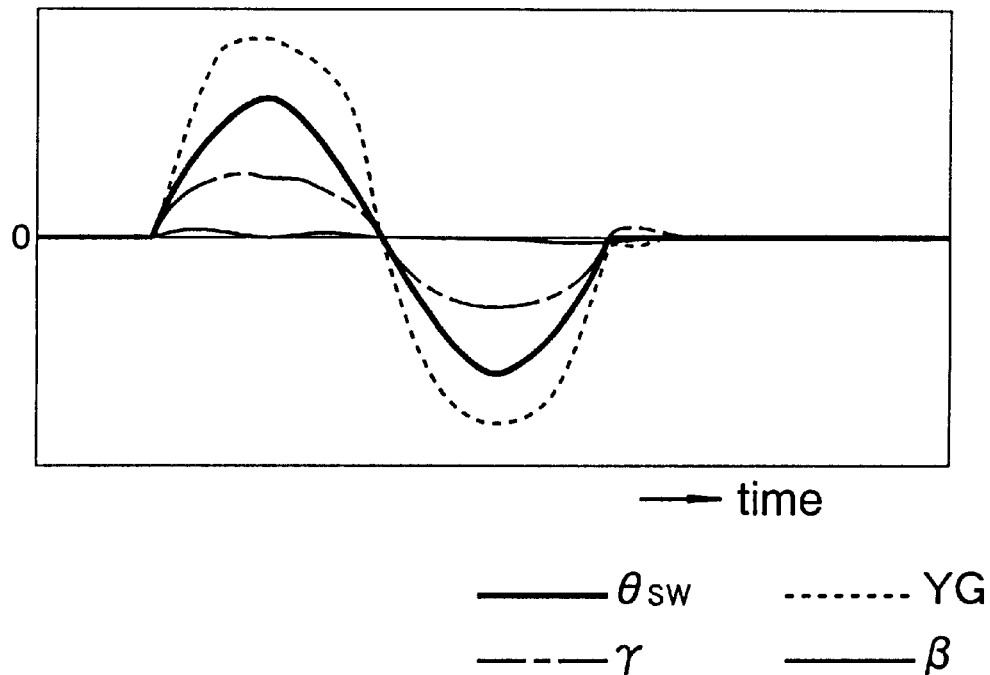
FIGS. 8a–b are graphs showing the behavior of the vehicle according to the second embodiment of the present invention.
Figure 8B:
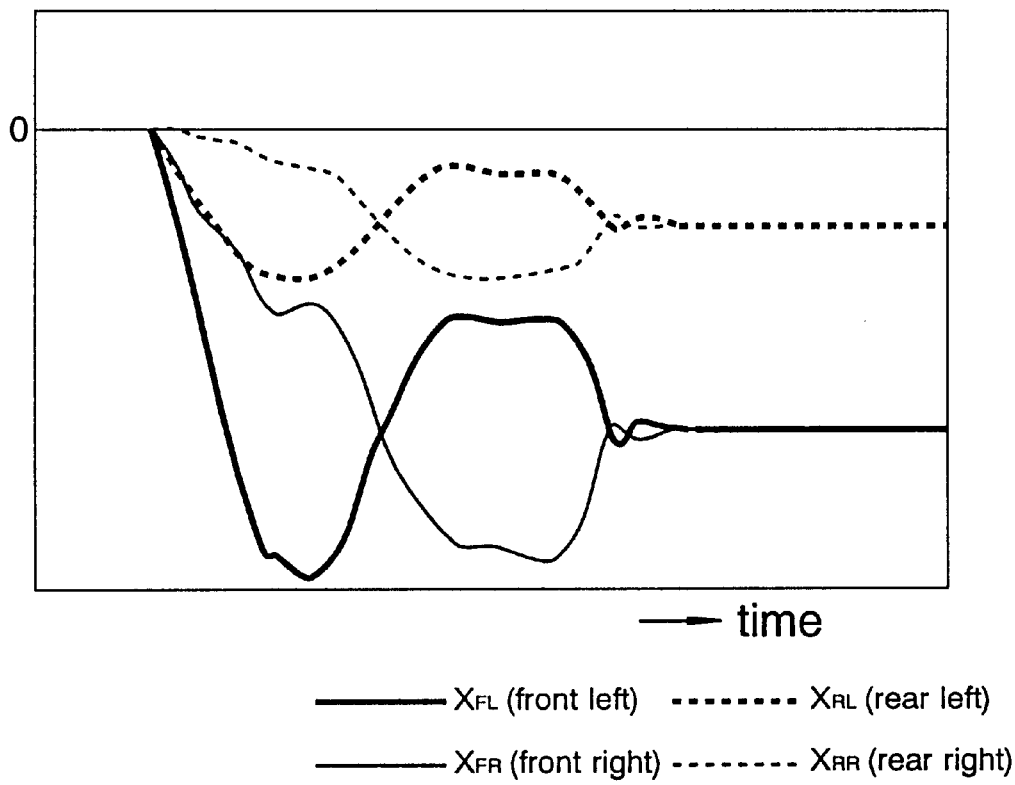
Figure 9A:
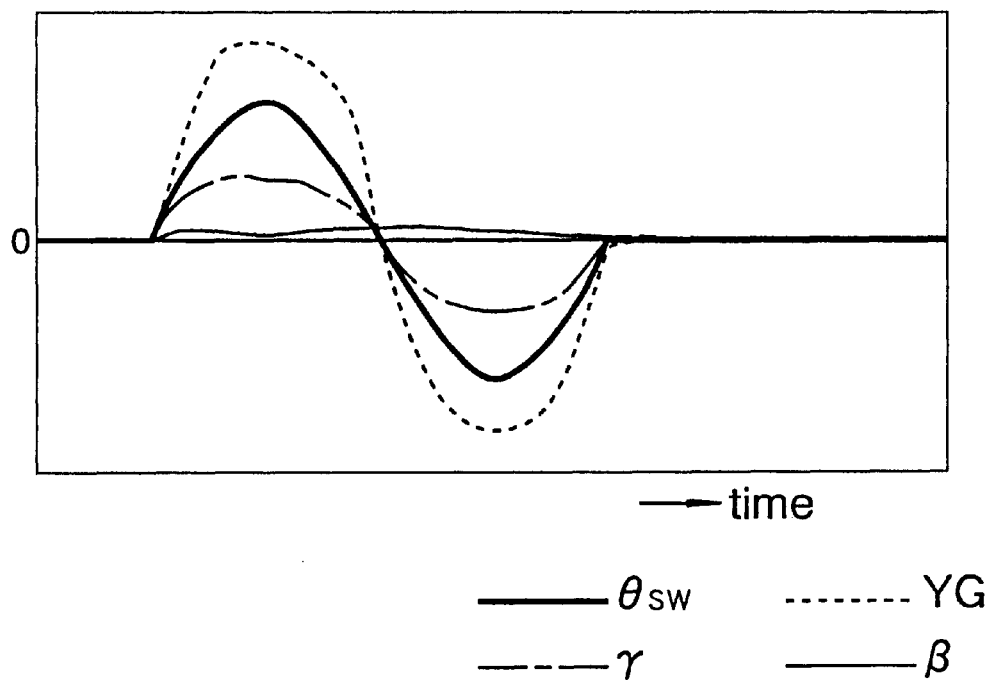
FIGS. 9a–b are graphs showing the behavior of the vehicle according to the third embodiment of the present invention.
Figure 9B:
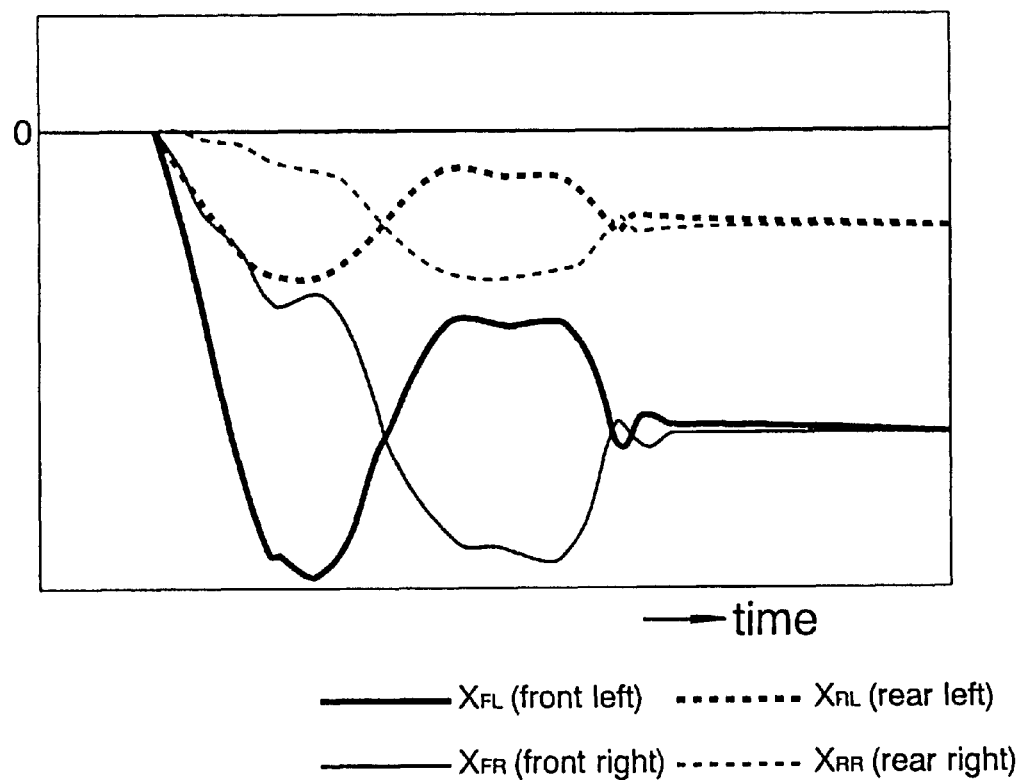

When larger values were selected for k and c to improve the convergent tendency of the vehicle slip angle β, the braking forces XR and XL which were the controlled quantities in this case tended to be oscillatory (see FIGS. 7a–b). Conversely, when the values of k and c were comparatively small, the responsiveness of the yaw rate and the lateral acceleration dropped.

[Embodiment 2]

When coefficient c→∞, the sliding surface in this case was given by $$S=\beta+a\{(Y_F+Y_R)/mV-\gamma\}=0 \quad (3\text{-}3)$$

In other words, the changes in the vehicle body slip angle β were given a secondary importance, and it was aimed that the vehicle body slip angle β is reduce to zero with the assistance of the proper selection of the yaw rate γ.

In this case, the control principle may be given by the following equation.

$$Mz = -(L_F Y_F - L_R Y_R) + (I/mV)(dY_F/dt + dY_R/dt) + \quad (8\text{-}3)$$
$$kI\{(Y_F + Y_R)/mV - \gamma\} + d\beta/dt(I/a) + \beta(kI/a)$$

The control process was such that the vehicle slip angle β was kept at zero, and the yaw rate y and the lateral acceleration YG both followed the steering angle of the steering wheel. By optimally selecting the coefficient a, the change in the braking force X of each of the wheels can be made gradual (see FIGS. 8a–b). By selecting a small value for the coefficient a, the vehicle slip angle β can be controlled to zero in an even better fashion depending on the responsiveness of the actuator.

[Embodiment 3]

When coefficient a→∞, the sliding surface in this case was given by $$S=(Y_F+Y_R)/mV-\gamma=0 \qquad (3\text{-}4)$$

In other words, controlling the vehicle body slip angle β to zero was given a secondary importance, and it was aimed that the responsiveness of the yaw rate γ may be compensated when β=0.

In this case, the control principle may be given by the following equation.

$$Mz = -(L_F Y_F - L_R Y_R) + (I/mV)(dY_F/dt + dY_R/dt) + kI\{(Y_F + Y_R)/mV - \gamma\} \qquad (8\text{-}4)$$

If the cornering forces $Y_F$ and $Y_R$ of the front and rear wheels, and the yaw rate γ can be directly detected, it is not necessary to detect the vehicle body slip angle β. Because the vehicle body slip angle β was not aimed to be reduced to zero, the deviation of P was somewhat larger (see FIGS. 9a–b).

[Embodiment 4]

Figure 10A:
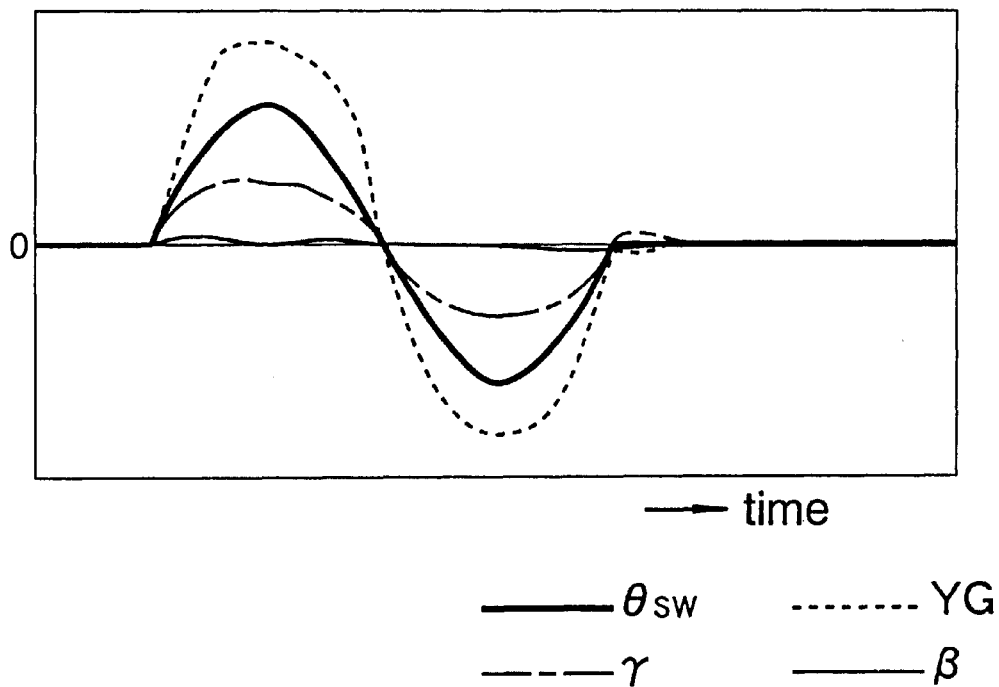
FIGS. 10a–b are graphs showing the behavior of the vehicle according to the fourth embodiment of the present invention.
Figure 10B:
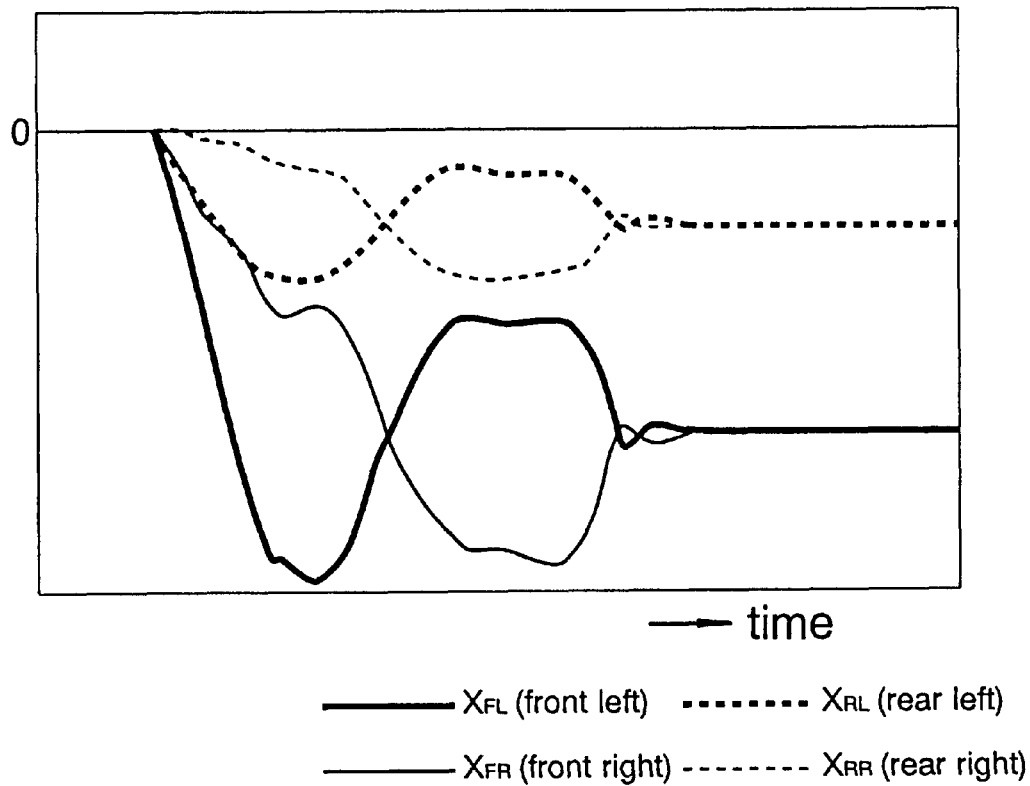

When the general equation (Equation 3) was selected for the sliding surface, a result substantially identical to that of Embodiment 2 (FIGS. 8a–b) was obtained as shown in FIGS. 10a–b. Therefore, the embodiment 2 was found to be basically most preferable because the sliding surface is simple, but the embodiment 4 has the advantage of allowing a wider range of tuning because all of the coefficients k, c and a can be adjusted at will.

The above described embodiments all controlled the braking force, but it is obvious that the present invention is equally applicable when the traction is controlled. In the latter case, a torque distribution control system such as the one disclosed in Japanese patent laid-open publication No. 7-17277 may be used to control the distribution of traction to the right and left wheels so that a desired yawing moment Mz may be obtained.

Thus, according to the present invention, the fore-and-aft force or the braking force or traction of the right and left wheels is controlled according to the cornering forces of the corresponding tires. Therefore, even under conditions where the gripping force of a tire is close to a limit, it is possible to improve the responsiveness and stability of the behavior of the vehicle. Further, by using the sliding mode control as described above, it is possible to improve the stability and the robustness of the control system.

Although the present invention has been described in terms of specific embodiments thereof, it is possible to modify and alter details thereof without departing from the spirit of the present invention.

What we claim is:

1. A method for controlling a vehicle behavior by individually controlling a fore-and-aft force of each of right and left vehicle wheels so as to achieve a desired vehicle behavior, comprising the steps of:

computing a desired yaw and/or vehicle body slip angle response;

computing a yawing moment which is required to be applied to the vehicle to achieve the desired yaw and/or vehicle body slip angle response according to a yaw motion equation of the vehicle for given dynamic state quantities of the vehicle including at least a traveling speed, and cornering forces of vehicle wheel tires which are determined either directly or indirectly; and controlling a fore-and-aft force which is applied to each of the wheels so as to achieve said computed yawing moment, wherein said fore-and-aft force is controlled by a sliding mode control process using a sliding surface based at least on the dynamic state quantity of the vehicle.

2. A method for controlling a vehicle behavior according to claim 1, wherein said vehicle includes a four wheel steering control system which seeks to reduce a vehicle body slip angle to zero in a linear region of dynamic properties of the wheel tires.

3. A method for controlling a vehicle behavior according to claim 1, wherein said cornering forces are estimated from the dynamic state quantity of the vehicle.

4. A method for controlling a vehicle behavior according to claim 3, wherein said cornering forces are estimated from a frictional coefficient of a road surface.

5. A method for controlling a vehicle behavior according to claim 1, wherein said fore-and-aft force includes a braking force.

6. A method for controlling a vehicle behavior according to claim 1, wherein said fore-and-aft force includes a traction.

7. A system for controlling a vehicle behavior so as to achieve a desired vehicle behavior by individually controlling a fore-and-aft force of each of right and left wheels, comprising:

fore-and-aft force control means for controlling a fore-and-aft force which is individually applied to each of right and left vehicle wheels;

dynamic state quantity detecting means for detecting a dynamic state quantity of the vehicle including at least a traveling speed;

cornering force determining means for determining a cornering force of each of the wheels;

desired yaw and/or vehicle body slip angle computing means for computing a desired yaw and/or vehicle body slip angle response; and yawing moment computing means for computing a yawing moment which is required to be applied to the vehicle to achieve the desired yaw and/or vehicle body slip angle response according to a yaw motion equation of the vehicle for given dynamic state quantities of the vehicle including at least a traveling speed, and cornering forces of vehicle wheel tires are determined either directly of indirectly;

wherein said fore-and-aft force control means is controlled by a sliding mode control process using a sliding surface based at least on the dynamic state quantity of the vehicle.

* * * * *